(12) United States Patent
Tong et al.

(10) Patent No.: US 12,553,965 B2
(45) Date of Patent: Feb. 17, 2026

(54) COIL INTERFACE APPARATUS, COIL APPARATUS AND MRI DEVICE

(71) Applicant: Siemens Healthineers AG, Erlangen (DE)

(72) Inventors: Tong Tong, Shenzhen (CN); Qiu Yi Zhang, Shenzhen (CN); Jan Bollenbeck, Bayern (DE)

(73) Assignee: Siemens Healthineers AG, Erlangen (DE)

( * ) Notice: Subject to any disclaimer, the term of this patent is extended or adjusted under 35 U.S.C. 154(b) by 144 days.

(21) Appl. No.: 18/308,047

(22) Filed: Apr. 27, 2023

(65) Prior Publication Data
US 2023/0349990 A1   Nov. 2, 2023

(30) Foreign Application Priority Data
Apr. 28, 2022  (CN) .......................... 202210457957.3

(51) Int. Cl.
*G01R 33/36* (2006.01)
*A61B 5/055* (2006.01)
*G01R 33/34* (2006.01)

(52) U.S. Cl.
CPC .............. *G01R 33/36* (2013.01); *A61B 5/055* (2013.01); *G01R 33/34084* (2013.01); *G01R 33/3692* (2013.01)

(58) Field of Classification Search
CPC .............. G01R 33/36; G01R 33/34084; G01R 33/3692; G01R 33/3657; G01R 33/34007; G01R 33/341; G01R 33/3621; A61B 5/055
See application file for complete search history.

(56) References Cited

U.S. PATENT DOCUMENTS

| | | | |
|---|---|---|---|
| 2014/0062485 A1* | 3/2014 | Okamoto ........... | G01R 33/3692 324/318 |
| 2017/0160356 A1* | 6/2017 | Liu .................... | G01R 33/3628 |
| 2019/0094318 A1* | 3/2019 | Okamoto ........... | G01R 33/3692 |
| 2023/0301597 A1* | 9/2023 | Spring ................ | H02J 50/12 |

* cited by examiner

*Primary Examiner* — Rishi R Patel
(74) *Attorney, Agent, or Firm* — Banner & Witcoff, Ltd.

(57) ABSTRACT

A coil interface apparatus may include: a plug, for connection to a coil apparatus for receiving a magnetic resonance signal via a test subject in the MRI device. The plug may include a first power coupler and at least one first signal coupler. The apparatus may include a socket, for connection to a main body of the MRI device. The socket may include a second power coupler and at least one second signal coupler. The at least one first signal coupler may send a magnetic resonance signal received from the coil apparatus to the at least one second signal coupler by induction. The at least one second signal coupler may receive the sent magnetic resonance signal by induction. The second power coupler may send a power signal to the first power coupler by induction, and the first power coupler may receive the sent power signal.

13 Claims, 4 Drawing Sheets

COIL INTERFACE APPARATUS, COIL APPARATUS AND MRI DEVICE

CROSS REFERENCE TO RELATED APPLICATIONS

This patent application claims priority to Chinese Patent Application No. 202210457957.3, filed Apr. 28, 2022, which is incorporated herein by reference in its entirety.

BACKGROUND

Field

The present disclosure relates to the technical field of medical equipment, in particular to a coil interface apparatus for an MRI device, a coil apparatus and an MRI device.

Related Art

Magnetic resonance imaging (MRI) devices are generally used for medical imaging. They are able to induce nuclear magnetic resonance of hydrogen protons within a human body by applying RF pulses of a specific frequency to the human body in a static magnetic field, and receive magnetic resonance signals of the human body in order to acquire a magnetic resonance image of the interior of the human body.

In general, magnetic resonance signals generated by the human body are acquired using a coil apparatus. The coil apparatus may be disposed close to the human body during operation, and connected via a cable and a plug to a socket of a main body of the MRI device, so as to acquire electric power from the main body of the MRI device and send the acquired magnetic resonance signals to the main body of the MRI device.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
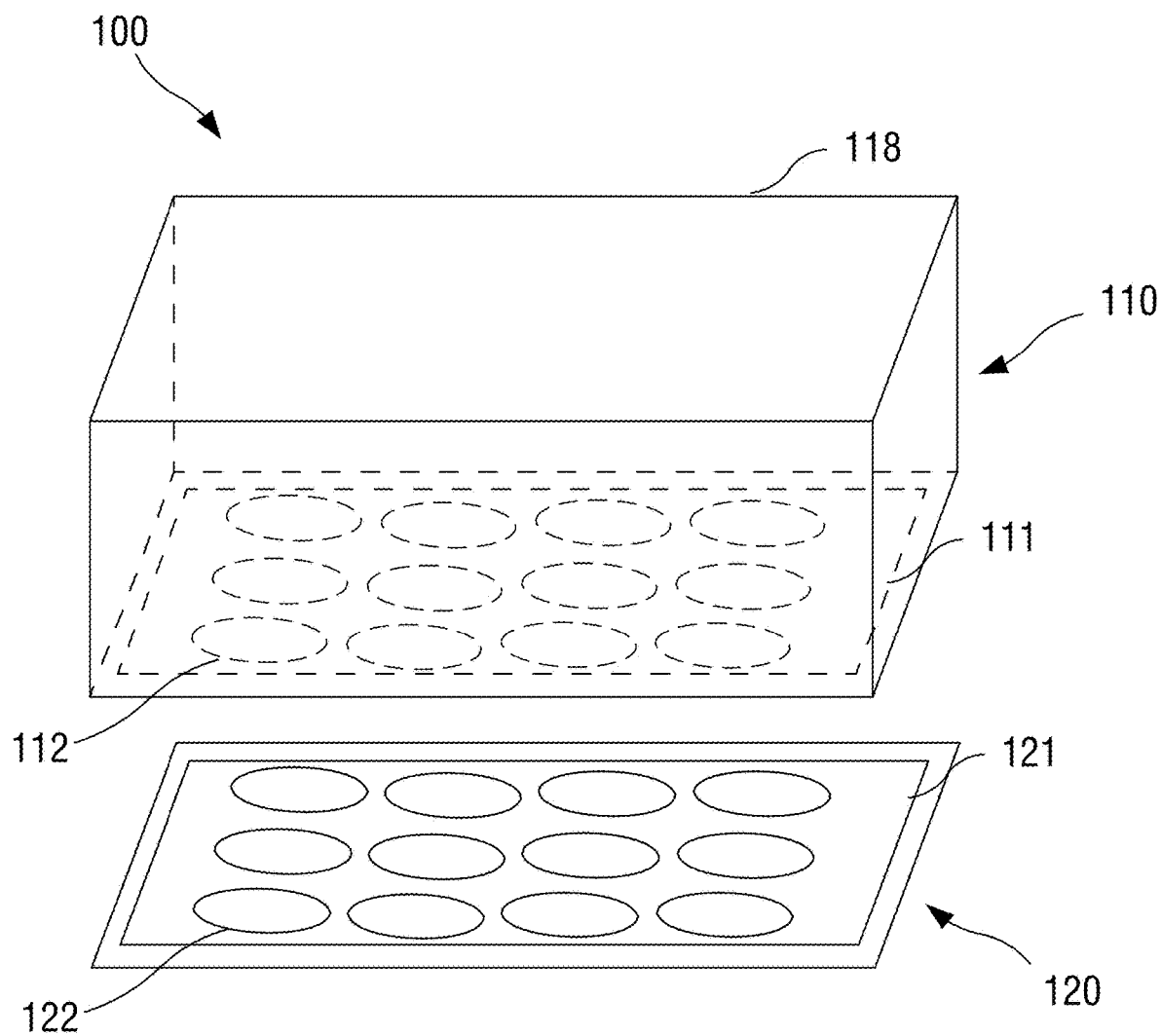
FIG. 1 is a schematic structural drawing of a coil interface apparatus according to one or more exemplary embodiments of the present disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An aspect of the present disclosure provides a coil interface apparatus for an MRI device, which may include: a plug, for connection to a coil apparatus for receiving a magnetic resonance signal via a test subject in the MRI device, a first power coupler and at least one first signal coupler; and a socket, for connection to a main body of the MRI device, and comprising a second power coupler and at least one second signal coupler; wherein the at least one first signal coupler is configured to send a magnetic resonance signal received from the coil apparatus to the at least one second signal coupler by induction, and the at least one second signal coupler is configured to receive the sent magnetic resonance signal by induction; wherein the second power coupler is configured to send a power signal to the first power coupler by induction, and the first power coupler is configured to receive the sent power signal.

Another aspect of embodiments of the present disclosure provides an MRI device, comprising: at least one coil apparatus, configured to be placed at or close to a tested part of a test subject and to receive a magnetic resonance signal via the test subject; a main body; and at least one coil interface apparatus according to an embodiment of the present disclosure, wherein the plug of the coil interface apparatus is connected to the coil apparatus, and the socket of the coil interface apparatus is disposed on the main body.

Another aspect of embodiments of the present disclosure provides a coil apparatus, having a plug which is not electrically connected to a main body of an MRI device. The plug comprises a first power coupler and at least one first signal coupler, and is configured to be inductively coupled to a socket on the main body of the MRI device when brought close to the socket, in order to send a magnetic resonance signal, received by the coil apparatus via a test subject in the MRI device, to the main body of the MRI device by induction, and receive a power signal from the main body by induction.

The coil interface apparatus, coil apparatus and MRI device according to embodiments of the present disclosure can realize the transmission, without an electrical connection, of electric power and magnetic resonance signals between the coil apparatus and the main body of the MRI device by induction, making the interface between the coil apparatus and the main body of the device easy to clean and maintain, thus reducing problems such as bad contact and device damage caused by the build-up of contaminants such as dust and liquid at the interface, and thereby reducing maintenance costs.

It should be understood that the content described in this section is not intended to identify key or important features of embodiments of the present application, and not intended to limit the scope of the present application. Other features of the present disclosure will become easy to understand through the following specification.

As used herein, "schematic" means "serving as an instance, example or illustration". No drawing or embodiment described herein as "schematic" should be interpreted as a more preferred or more advantageous technical solution.

To make the drawings appear uncluttered, only those parts relevant to the present disclosure are shown schematically in the drawings; they do not represent the actual structure thereof as a product. Furthermore, to make the drawings appear uncluttered for ease of understanding, in the case of components having the same structure or function in certain drawings, only one of these is drawn schematically, or only one is marked.

In this text, "a" does not only mean "just this one"; it may also mean "more than one". As used herein, "first" and "second" etc. are merely used to differentiate between parts, not to indicate their order or degree of importance, or any precondition of mutual existence, etc.

Magnetic resonance imaging (MRI) is a technology in which the phenomenon of magnetic resonance is used to perform imaging. An MRI device transmits RF pulses of a specific frequency to a test subject in a static magnetic field by means of an RF coil to induce nuclear magnetic resonance of hydrogen protons in the body of the test subject for example, and uses a coil apparatus to receive magnetic resonance signals of the body of the test subject, the received magnetic resonance signals then being processed by a computer to form an image.

An MRI system generally comprises a cavity-type magnet (e.g. a superconducting magnet) for providing a static magnetic field, cavity-type gradient coils inside the magnet, a cavity-type body coil inside the gradient coils, a bed body on which the test subject is placed, and a coil apparatus for receiving magnetic resonance signals from the body of the test subject.

The gradient coils are used for position encoding during imaging. The gradient coils may be arranged inside the magnet used to provide the static magnetic field, and generally may consist of three sets of mutually orthogonal coils corresponding to the X axis, Y axis and Z axis respectively. The three sets of coils forming the gradient coils respectively generate gradient fields exhibiting magnetic field strength variation along the X axis, Y axis and Z axis.

The body coil is generally an RF coil arranged inside the gradient coils, and is used to generate a high-frequency magnetic field. The body coil applies the high-frequency magnetic field to the test subject in the static magnetic field.

The coil apparatus may comprise an RF receiving coil arranged inside the gradient coils, and may further be configured as a local coil arranged close to the test subject, to at least receive magnetic resonance signals returned from the test subject. The coil apparatus may consist of multiple coil units. The coil apparatus may, under the control of a tuning/detuning control signal, subject one or more coil units in the coil apparatus to tuning or detuning. The coil units are excited in a tuned state to receive magnetic resonance signals from the test subject which are produced under excitation by high-frequency electromagnetic wave signals at the Larmor frequency, or other high-frequency/RF electromagnetic wave signals returned by the test subject.

The coil apparatus may be arranged, as a local coil, at a near end of the test subject. Examples are a spine coil mounted at a bed body position of the MRI device; an abdomen coil or chest coil covering the test subject's abdomen or chest; and various other local coils covering particular parts of the test subject, such as a knee coil, shoulder coil, wrist coil, body array coil, head/neck coil, etc. The abovementioned local coil is used to receive magnetic resonance signals of the corresponding part of the test subject. Additionally, due to being close to the corresponding part (as is the case with, for example, an abdomen coil, spine coil or chest coil, etc.), it may also be used to monitor certain important organs having physiological movement signals of periodic movement, such as the heart, lungs, etc.

During operation, the coil apparatus must be connected via an interface apparatus to a main body of the MRI device, for example the bed body or another component of the device (e.g. an RF receiving component, a power supply, a tuning/detuning control component or a receiving channel switching component, etc.), to acquire electric power from the main body of the MRI device and send the acquired magnetic resonance signal to the main body of the MRI device. The interface apparatus may comprise a plug and a socket forming a pair; the coil apparatus is connected by means of a cable and the plug to the socket, which is connected to the main body of the MRI device.

In the related art, the abovementioned plug and socket are of the insertion-connection type; for example, they respectively comprise multiple paired male pins or female pins encapsulated in a plastic module. Insertion-connection type plugs and sockets of this kind are difficult to clean and maintain; moreover, contaminants such as dust and liquid easily build up in the interface part, resulting in bad contact at the interface part or even device short-circuiting and damage, so maintenance costs are high. Additionally, multiple plug-in and pull-out operations are likely to cause aging of the interface part and damage thereto, affecting the reliability of connection.

For this reason, embodiments of the present disclosure provide a coil interface apparatus for an MRI device, a coil apparatus having a plug, and an MRI device.

FIG. 1 is a schematic structural drawing of a coil interface apparatus according to some embodiments of the present disclosure. As shown in FIG. 1, one aspect of embodiments of the present disclosure provides a coil interface apparatus 100 for an MRI device, may include a plug 100, for connection to a coil apparatus for receiving a magnetic resonance signal via a test subject in the MRI device, and a socket 120, for connection to a main body of the MRI device. The plug 110 may include a first power coupler 111 and at least one first signal coupler 112. The socket 120 may include a second power coupler 121 and at least one second signal coupler 122. The at least one first signal coupler 112 may be configured to send, by induction, a magnetic resonance signal received from the coil apparatus to the at least one second signal coupler 122, and the at least one second signal coupler 122 may be configured to receive, by induction, the magnetic resonance signal that is sent. The second power coupler 121 may be configured to send a power signal to the first power coupler 111 by induction, and the first power coupler 111 may be configured to receive the power signal that is sent. In an exemplary embodiment, the plug 110 (which may include one or more components therein) and/or the socket 120 (which may include one or more components therein) may include processing circuitry that is configured to perform one or more respective functions and/or operations of the plug 110, socket 120, and/or one or more respective components therein.

In some embodiments, the first power coupler 111 and the first signal coupler 112 may be connected to the coil apparatus via a cable. The second power coupler 121 and the second signal coupler 122 may be connected to the main body of the MRI device via a cable. The first signal coupler 112, the second signal coupler 122, the first power coupler 111 and the second power coupler 121 may be coil components, and the power signal may be an AC signal. When the power signal from the main body of the MRI device flows through the second power coupler 121, an induced current can be generated by magnetic field resonance in the first power coupler 111 near the second power coupler 121, such that electric power from the main body of the device is transferred to the first power coupler 111 to power the coil apparatus. Similarly, when the magnetic resonance signal received by the coil apparatus flows through the first signal coupler 112, an induced current can be generated by magnetic field resonance in the second signal coupler 122 near the first signal coupler 112, such that the received magnetic resonance signal is sent to the main body of the device, for use in magnetic resonance imaging.

It should be understood that the plug 110 comprising the first power coupler 111 and the first signal coupler 112, and the socket 120 comprising the second power coupler 121 and the second signal coupler 122, can realize inductive coupling by being brought close to each other. Moreover, during use, the plug 110 and socket 120 may be roughly aligned with each other to increase the signal transmission efficiency.

For illustrative purposes, FIG. 1 shows 12 sets of signal couplers and 1 set of power couplers, but it should be understood that this is merely an example, and the numbers, shapes and arrangements, etc. of the signal couplers and power couplers are not limited to the form shown in FIG. 1.

In some embodiments, as shown in FIG. 1, the plug 110 may comprise a planar first printed circuit board (PCB), with the first power coupler 111 and at least one first signal coupler 112 integrated in the first PCB; and the socket 120 may comprise a planar second PCB, with the second power coupler 121 and at least one second signal coupler 122 integrated in the second PCB. By way of example, the plug 110 may comprise a cover 118, which cover 118 encapsulates the first PCB. The second PCB may be mounted on the bed body of the MRI device; as the second PCB is planar, it will not affect the bed body's appearance.

Compared with the related art, in the coil interface apparatus according to embodiments of the present disclosure, as a result of providing couplers in the socket and plug respectively, the socket and plug are able, when brought close to each other, to exchange electric power and magnetic resonance signals between the coil apparatus and the main body of the MRI device, thus reducing problems such as bad contact and device damage caused by the build-up of contaminants such as dust and liquid at the interface, and thereby reducing maintenance costs.

In addition, the plug and socket may also be configured to have a planar shape for example, which is easy to clean and disinfect, such as a PCB, which is flatter and thinner, and takes up little space.

Figure 2:
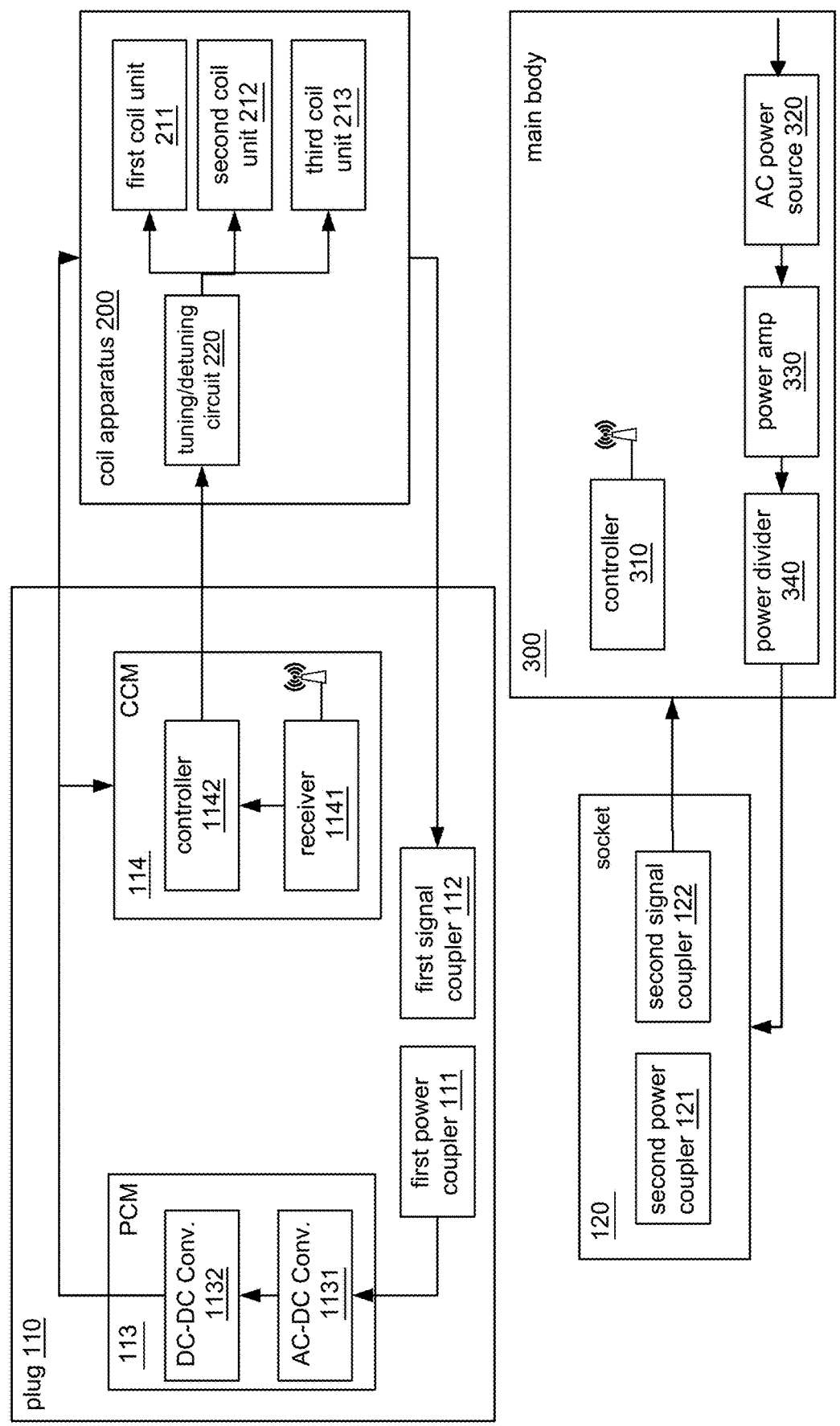
FIG. 2 is a schematic block diagram of an MRI device according to one or more exemplary embodiments of the present disclosure.

FIG. 2 is a schematic block diagram of an MRI device according to some embodiments of the present disclosure. The MRI device comprises a coil interface apparatus 100 according to some embodiments of the present disclosure. Referring to FIG. 2, the coil interface apparatus comprises a plug 110 and a socket 120, the plug 110 being connected to a coil apparatus 200 for receiving a magnetic resonance signal via a test subject in the MRI device, and the socket 120 being connected to a main body 300 of the MRI device, the plug 110 and socket 120 being inductively coupled to transmit a power signal and the magnetic resonance signal. In an exemplary embodiment, the coil apparatus 200 includes processing circuitry that is configured to perform one or more functions and/or operations of the coil apparatus 200. One or more components of the apparatus 200 may include processing circuitry that is configured to perform one or more respective functions and/or operations of the component(s).

In some embodiments, the power signal may be an AC power signal which, for example, is supplied by an AC power source in the main body 300 of the MRI device, and is transmitted to the plug 110 by inductive coupling via the socket 120 of the coil interface apparatus.

In some embodiments, the plug 110 may comprise a power conversion module (power converter) 113. The power converter 113 is connected to the first power coupler 111, and configured to convert the AC power signal received by the first power coupler 111 from the second power coupler 121 to a DC power signal, and modulate the DC power signal to the DC level required by the coil apparatus. In some examples, the power converter 113 may comprise an AC-DC converter 1131 and a DC-DC converter 1132. The AC-DC converter 1131 may be a rectifier. Alternatively, or additionally, the DC-DC converter 1132 may comprise a low-dropout (LDO) regulator. The oscillator frequency of the DC-DC converter may be chosen in a range that does not affect reception of magnetic resonance signals by the coil apparatus. The DC electricity resulting from rectification and modulation in the power converter 113 may be provided to various modules in the plug of the coil interface apparatus which require power, and may also be provided to the coil apparatus 200. In this way, the plug of the coil interface apparatus and the coil apparatus may be supplied with power wirelessly, without the need to connect them via cables to a power source for supplying power in the main body of the MRI device. In an exemplary embodiment, the power converter 113 includes processing circuitry that is configured to perform one or more functions and/or operations of the power converter 113. One or more components of the power converter 113 may include processing circuitry that is configured to perform one or more respective functions and/or operations of the component(s).

In some embodiments, the frequency of the AC power signal supplied by the AC power source may be 5 Mhz, to reduce the size of the AC power source and avoid interference with the magnetic resonance signal. The DC level required by the coil apparatus may be 3 V, i.e. the voltage outputted to the coil apparatus after rectification and modulation in the power converter 113 is 3 V.

In some embodiments, the plug 110 may further comprise: a coil controller 114, configured to receive a control signal wirelessly from the main body of the MRI device and generate a tuning/detuning signal to control tuning or detuning of the coil apparatus.

The process of magnetic resonance imaging comprises an RF pulse transmission stage in which RF pulses are transmitted to a test subject in a static magnetic field by means of an RF coil to induce nuclear magnetic resonance, and a signal acquisition stage in which the coil apparatus is used to receive magnetic resonance signals of the body of the test subject. The coil apparatus needs to be in a tuned state in the signal acquisition stage, in order to receive high-frequency/RF magnetic resonance signals via the test subject, and needs to be in a detuned state in the RF pulse transmission stage, in order to suppress the entry of RF pulse signals into the coil apparatus, which would cause noise in the magnetic resonance image.

In some embodiments, the coil control module (coil controller) 114 may comprise a receiver 1141 and a controller 1142. The receiver 1141 is used to receive the control signal from the main body of the MRI device by a wireless method; the controller 1142 is connected to the coil apparatus and used to demodulate the control signal, to control tuning or detuning of the coil apparatus. In an exemplary embodiment, the coil controller 114 includes processing circuitry that is configured to perform one or more functions and/or operations of the coil controller 114. One or more components of the coil controller 114 may include processing circuitry that is configured to perform one or more respective functions and/or operations of the component(s).

By way of example, the wireless method may comprise Bluetooth, a wireless local area network, mobile communication (LTE, 4G and/or 5G mobile radio standard), infrared transmission, etc.

In some embodiments, the coil controller 114 is further configured to wirelessly transmit coil identification information characterizing the coil apparatus to the main body of the MRI device. By way of example, the coil identification information may be stored in a memory of the coil controller 114. In some examples, the coil controller 114 sends the coil identification information to the main body of the MRI device in response to inductive coupling of the plug 110 and the socket 120. The coil identification information may comprise information characterizing the number of coil units in the coil apparatus and their model numbers, etc. In this way, the device main body end can learn the configuration of the coil units in the coil apparatus currently in use.

Continuing to refer to FIG. 2, the MRI device according to some embodiments of the present disclosure comprises: at least one coil apparatus 200, configured to be placed at or close to a tested part of the test subject and to receive a magnetic resonance signal via the test subject; the main body 300; and at least one coil interface apparatus according to any of the above embodiments of the present disclosure, wherein the plug 110 of the coil interface apparatus is connected to the coil apparatus 200, and the socket 120 of the coil interface apparatus is disposed on the main body 300. In an exemplary embodiment, the main body 300 includes processing circuitry that is configured to perform one or more functions and/or operations of the main body 300. One or more components of the main body 300 may include processing circuitry that is configured to perform one or more respective functions and/or operations of the component(s).

In some embodiments, the plug 110 is connected to the coil apparatus 200 via a cable, and the socket 120 is connected to the main body 300 of the MRI device via a cable. The socket 120 may be integrated on, for example, a bed body of the main body 300 that is used to receive the test subject, e.g. integrated at a position on the bed body that the plug 110 can easily get close to.

In some embodiments, the main body 300 may comprise a controller 310, the controller 310 being configured to generate a control signal and send the control signal by a wireless method to the coil controller 114 of the coil interface apparatus, to control tuning or detuning of the coil apparatus 200. By way of example, the wireless method may comprise Bluetooth, a wireless local area network, mobile communication (LTE, 4G and/or 5G mobile radio standard), infrared transmission, etc. In an exemplary embodiment, the controller 310 includes processing circuitry that is configured to perform one or more functions and/or operations of the controller 310.

In some embodiments, the controller 310 is further configured to receive coil identification information characterizing the coil apparatus 200, to learn the number of coil units in the coil apparatus 200 currently in use, and their model numbers, etc.

In some embodiments, the main body 300 may further comprise an AC power source 320. The AC power source 320 is connected to the socket 120 of the coil interface apparatus for the purpose of supplying the AC power signal.

In some embodiments, the AC power source 320 comprises a phase locked loop, to synchronize a clock of the AC power signal outputted from the AC power source 320, and thereby provide a reference clock for the coil apparatus 200 for example.

In some embodiments, the main body 300 may further comprise a power amplifier 330, to amplify the AC power signal.

In some embodiments, the coil apparatus 200 may be used to receive a magnetic resonance signal generated by a local part (e.g. the head, chest cavity, leg, etc.) of the test subject, or used to receive a magnetic resonance signal generated by the whole body of the test subject. In some embodiments, there may be multiple coil apparatuses 20, so signals from the head, chest cavity and leg of the test subject for example can be acquired simultaneously. Correspondingly, the MRI device may comprise multiple coil interface apparatuses 100, and the main body 300 comprises a power divider 340 for distributing the AC power signal supplied by the AC power source 320 to the multiple coil interface apparatuses 100. Here, the power amplifier 330 may be disposed between the AC power source 320 and the power divider 340, to amplify the power signal supplied by the AC power source 320 and then supply it to the power divider 340. FIG. 2 shows one coil apparatus 200 and one coil interface apparatus comprising a plug 110 and a socket 120; multiple coils and multiple coil interface apparatuses could be correspondingly provided.

Figure 3:
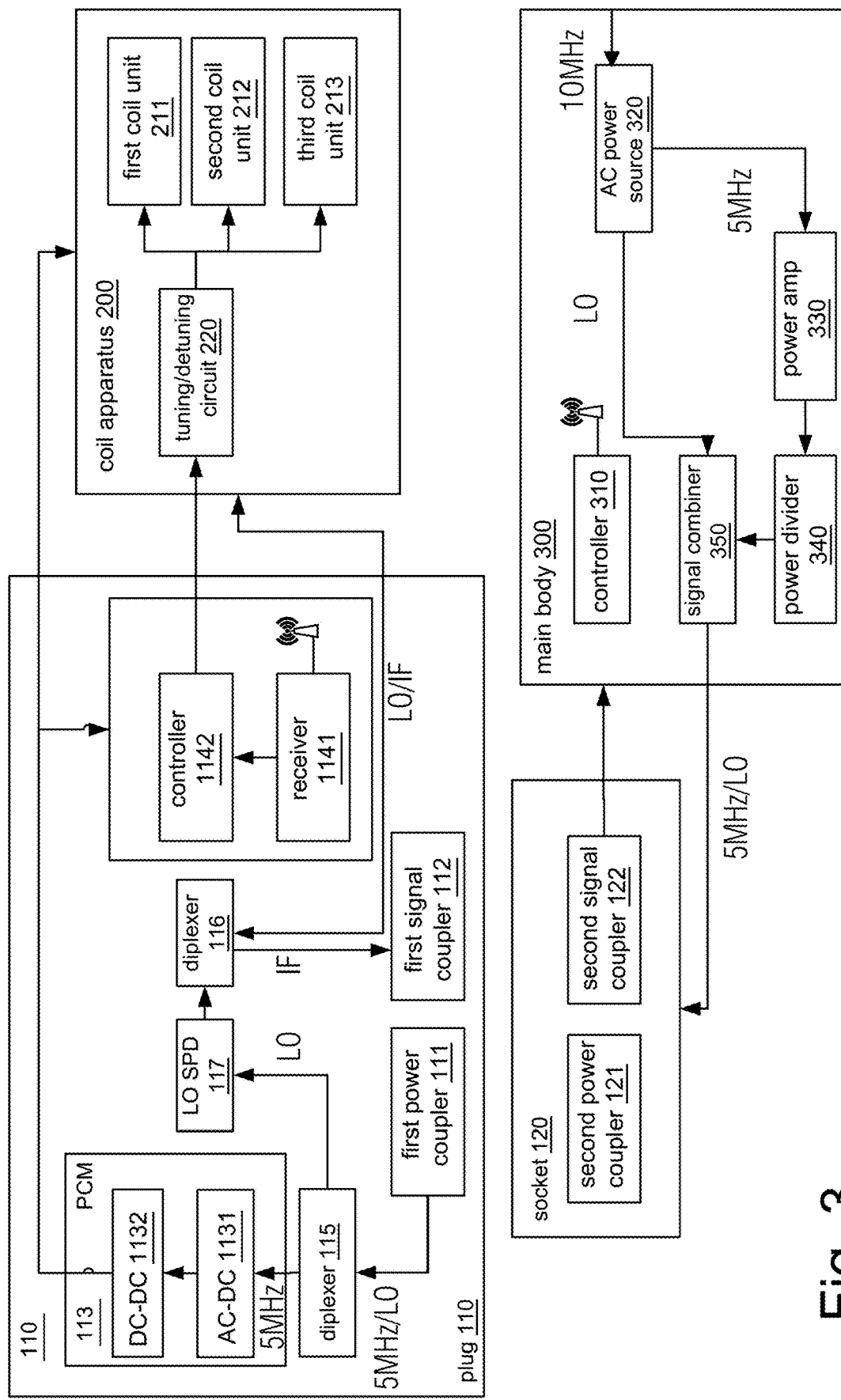
FIG. 3 is a schematic block diagram of an MRI device according to one or more exemplary embodiments of the present disclosure.

FIG. 3 is a schematic block diagram of an MRI device according to some embodiments of the present disclosure. The MRI device comprises a coil interface apparatus 100 according to some embodiments of the present disclosure. In FIG. 3, the same reference labels are used for elements that are identical or similar to those in FIG. 2. Similar to FIG. 2, the coil interface apparatus comprises a plug 110 and a socket 120, the plug 110 being connected to a coil apparatus 200 for receiving a magnetic resonance signal via a test subject in the MRI device, and the socket 120 being connected to a main body 300 of the MRI device, the plug 110 and socket 120 being inductively coupled to transmit a power signal and the magnetic resonance signal. Unlike FIG. 2, in the embodiment shown in FIG. 3, the magnetic resonance signal is fed back by means of an intermediate frequency (IF). In this case, it is necessary to provide a local oscillator signal (LO signal), for mixing with an RF signal via the test subject to generate an IF signal.

Referring to FIG. 3, in some embodiments, the second power coupler 121 in the socket (for connection to the MRI main body) of the coil interface apparatus is configured to receive a combination signal combining a local oscillator signal and an AC power signal supplied by the main body (the combination signal will be described in detail below), and send the combination signal to the first power coupler 111.

In some embodiments, the plug 110 of the coil interface apparatus further comprises a first diplexer 115. The first diplexer 115 is connected between the first power coupler 111 and the power converter 113, and used to recover a separate AC power signal and a separate local oscillator signal from the combination signal, and transmit the recovered AC power signal to the power converter 113.

In some embodiments, the combination signal may comprise a clock signal, and the AC power signal and local oscillator signal recovered from the first diplexer 115 may comprise clock signals. The power converter 113 may comprise a DC-DC converter 1132. The DC-DC converter may obtain the clock signal from the recovered AC power signal or local oscillator signal, to synchronize a reference clock thereof with a reference clock of the main body of the MRI device.

In some embodiments, the plug 110 may further comprise a second diplexer 116. The second diplexer 116 is connected between the first diplexer 115 and the coil apparatus. The second diplexer 116 is used to receive the local oscillator signal recovered by the first diplexer 115 and send the local oscillator signal to the coil apparatus 200. At the coil apparatus 200, the local oscillator signal is mixed with the magnetic resonance signal from the test subject to generate an IF signal to be fed back to the MRI device. The second diplexer 116 will receive the IF signal generated by mixing the magnetic resonance signal and the local oscillator signal and outputted by the coil apparatus 200. Moreover, the second diplexer 116 is further connected to at least one first signal coupler 112, for the purpose of sending the received IF signal to the at least one first signal coupler 112, and transmission to the main body 300 of the MRI device is then possible via the second signal coupler 122 inductively coupled to the first signal coupler 112.

In some embodiments, the degree of attenuation of the magnetic resonance signal can be reduced by providing the first diplexer 115 and second diplexer 116, and supplying the local oscillator signal to the coil apparatus in order to mix a high-frequency/RF magnetic resonance signal with the local oscillator signal to generate the IF signal.

In some embodiments, the coil apparatus may comprise multiple coil units, for example the three coil units shown in FIG. 3: a first coil unit 211, a second coil unit 212 and a third coil unit 213. When there are multiple coil units, the plug 110 may further comprise a local oscillator signal power divider 117, which is connected between the first diplexer 115 and the second diplexer 116 in order to split the local oscillator signal recovered by the first diplexer 115 into multiple local oscillator signals, which are distributed via the second diplexer 116 to the coil units of the coil apparatus, for mixing with the magnetic resonance signals received by the coil units to generate the IF signal.

Similar to the embodiment shown in FIG. 2, in the embodiment shown in FIG. 3, the main body 300 may comprise an AC power source 320, which for example supplies a 10 Mhz AC power signal. The AC power source 320 may comprise a phase locked loop, to synchronize a clock of the AC power signal outputted from the AC power source 320, and thereby provide a reference clock for the coil apparatus 200 for example. Via the phase locked loop, the AC power signal supplied by the AC power source 320 may be split into two signals: a local oscillator signal (LO signal), and an AC signal of about 5 Mhz for supplying power. Further, the main body 300 may comprise a power amplifier 330, for amplifying the AC signal of about 5 MHz. In addition, the main body 300 may further comprise a power divider 340, to distribute the AC signal of about 5 Mhz to multiple coil interface apparatuses 100.

Referring to FIG. 3, the main body 300 may further comprise a signal combiner 350, for generating multiple combination signals based on the local oscillator signal and multiple power signals distributed by the power divider 340, and respectively sending the multiple combination signals to corresponding coil interface apparatuses amongst the multiple coil interface apparatuses. By way of example, the signal combiner 350 may take the form of a diplexer. FIG. 3 shows only one coil interface apparatus; in some examples, multiple coil interface apparatuses may be correspondingly provided.

Referring to FIGS. 2 and 3, in some embodiments, the coil apparatus 200 may comprise multiple coil units 211-213, to receive multiple magnetic resonance signals. It should be understood that 3 coil units are shown as an example in FIGS. 2 and 3, but the number of coil units is not limited to this; also, different coil apparatuses 200 may contain the same number of coil units or different numbers of coil units.

In some embodiments, the coil apparatus 200 may comprise a tuning/detuning circuit 220. The tuning/detuning circuit 220 may be configured to receive a control signal from the coil controller 114, and control tuning or detuning of one or more of the multiple coil units 211-213 according to the control signal. In an exemplary embodiment, the tuning/detuning circuit includes processing circuitry that is configured to perform one or more functions and/or operations of the circuit 220.

In some embodiments, the coil apparatus 200 may comprise a mixer, configured to acquire a local oscillator signal and generate an IF signal based on the local oscillator signal and the magnetic resonance signal. The IF signal is transmitted to the coil interface apparatus, and sent by induction from at least one first signal coupler 112 of the plug of the coil interface apparatus to at least one second signal coupler 122 of the socket of the coil interface apparatus.

Another aspect of embodiments of the present disclosure provides a coil apparatus, having a plug which is not electrically connected to a main body of an MRI device. The plug comprises a first power coupler and at least one first signal coupler, and is configured to be inductively coupled to a socket on the main body of the MRI device when brought close to the socket, in order to send a magnetic resonance signal, received by the coil apparatus via a test subject in the MRI device, to the main body of the MRI device by induction, and receive a power signal from the main body by induction.

Figure 4:
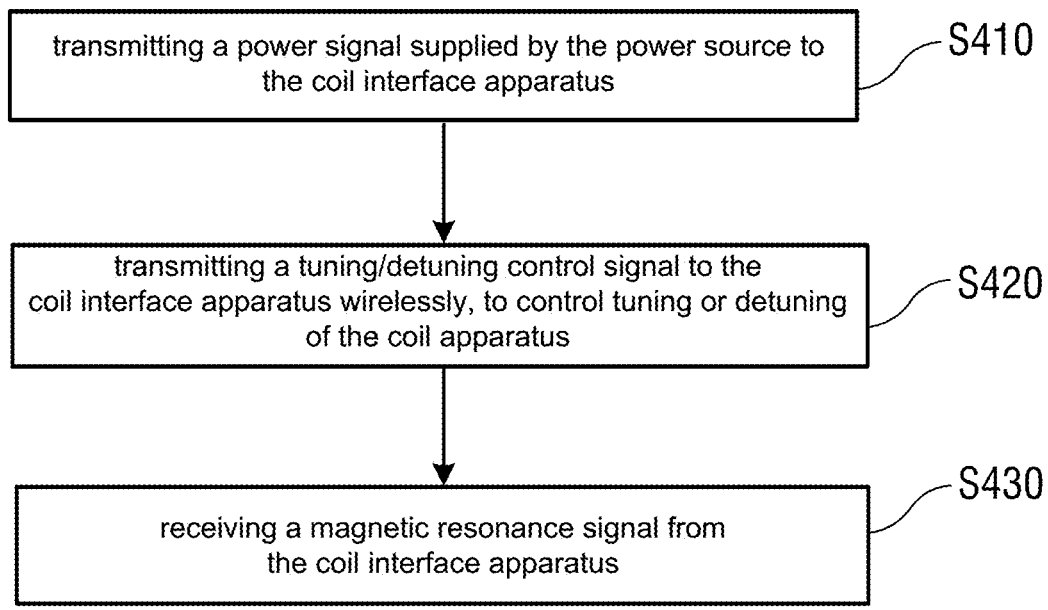
FIG. 4 is a flow chart of an MRI device control method according to one or more exemplary embodiments of the present disclosure.

FIG. 4 is a flow chart of an MRI device control method according to some embodiments of the present disclosure. Referring to FIG. 4, another aspect of embodiments of the present disclosure provides a control method for an MRI device, the MRI device comprising a coil interface apparatus according to any embodiment of the present disclosure, wherein the coil interface apparatus comprises a plug and a socket, the plug being connected to a coil apparatus for receiving a magnetic resonance signal via a test subject in the MRI device, and the socket being connected to a power source of the MRI device, the plug and socket being inductively coupled to transmit a power signal and the magnetic resonance signal. The control method comprises:

S410, transmitting a power signal supplied by the power source to the coil interface apparatus;

S420, transmitting a tuning/detuning control signal to the coil interface apparatus wirelessly, to control tuning or detuning of the coil apparatus; and S430, receiving a magnetic resonance signal from the coil interface apparatus.

In step S410, the MRI device transmits the power signal supplied by the power source thereof, after processing (e.g. amplification, distribution, or where necessary, generation of a local oscillator signal and a clock signal, etc.), to the socket of the coil interface apparatus disposed on a main body of the MRI device via a cable, and the socket of the coil interface apparatus sends the processed power signal by inductive coupling to the plug of the coil interface apparatus. After undergoing rectification and modulation in the plug, the power signal is delivered to various components requiring electric power in the plug and to the coil apparatus. Since power is transmitted between the plug and the socket by induction, there is no need for a cable, and no need to connect the coil apparatus to the main body of the MRI device via a cable for the supply of power.

In step 420, the MRI device transmits the tuning/detuning control signal to the coil interface apparatus by a wireless method, to control tuning or detuning of the coil apparatus. As stated above, the wireless method may comprise Bluetooth, a wireless local area network, mobile communication (LTE, 4G and/or 5G mobile radio standard), infrared transmission, etc. Thus, the additional provision of a cable for control signal transmission between the main body of the MRI device and the coil interface apparatus or coil apparatus is avoided.

After the coil apparatus receives the power signal and the tuning/detuning control signal from the coil interface apparatus, the tuning/detuning control signal controls tuning or detuning of the coil apparatus, which then receives the magnetic resonance signal generated by the test subject, and transmits the magnetic resonance signal to the plug of the coil interface apparatus connected thereto. The plug of the coil interface apparatus then transmits the magnetic resonance signal to the socket of the coil interface apparatus by inductive coupling.

In step 430, the MRI device receives the magnetic resonance signal from the socket of the coil interface apparatus connected to the main body thereof. The MRI device processes the magnetic resonance signal, to generate an image corresponding to the test subject.

The coil interface apparatus, MRI device and control method thereof according to embodiments of the present disclosure can realize interaction between the coil apparatus and the main body of the MRI device without an electrical connection.

It should be understood that, using the procedures in various forms shown above, steps may be reordered, added or deleted. For example, the steps recorded in the present application may be performed in parallel, or performed sequentially or in a different order, as long as the expected results of the technical solution disclosed in the present application can be achieved; no restrictions are imposed herein in this regard.

The above are merely embodiments of the present application, which are not intended to limit it. Any amendments, equivalent substitutions or improvements, etc. made within the spirit and principles of the present application shall be included in the scope of protection thereof.

To enable those skilled in the art to better understand the solution of the present disclosure, the technical solution in the embodiments of the present disclosure is described clearly and completely below in conjunction with the drawings in the embodiments of the present disclosure.

Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

100: coil interface apparatus
110: plug
111: first power coupler
112: first signal coupler
118: cover
120: socket
121: second power coupler
122: second signal coupler
113: power converter
1131: AC-DC converter
1132: DC-DC converter
114: coil controller
1141: receiver
1142: controller
200: coil apparatus
211: first coil unit
212: second coil unit
213: third coil unit
220: tuning/detuning circuit
300: main body
310: controller
320: AC power source
330: power amplifier
340: power divider
115: first diplexer
116: second diplexer
117: local oscillator signal power divider
350: signal combiner

The invention claimed is:

1. A coil interface apparatus for a magnetic resonance imaging (MRI) device, comprising:
a plug configured to connect to a coil apparatus to receive a magnetic resonance signal via a test subject in the MRI device, the plug including a first power coupler, a power converter connected to the first power coupler, at least one first signal coupler, a first diplexer connected between the first power coupler and the power converter and a second diplexer connected between the first diplexer and the coil apparatus; and
a socket configured to connect to a main body of the MRI device, the socket including a second power coupler and at least one second signal coupler, wherein:
the at least one first signal coupler is configured to inductively send a magnetic resonance signal received from the coil apparatus to the at least one second signal coupler by induction, and the at least one second signal coupler is configured to inductively receive the sent magnetic resonance signal;
the second power coupler is configured to: inductively send an alternating current (AC) power signal to the first power coupler and the first power coupler is configured to receive the sent power signal, and receive a combination signal combining a local oscillator signal and an AC power signal supplied by the main body, and send the combination signal to the first power coupler;
the first diplexer is configured to: recover a separate AC power signal and a separate local oscillator signal from the combination signal, and transmit the recovered AC power signal to the power converter;
the power converter is configured to: convert the AC power signal received by the first power coupler from the second power coupler to a direct current (DC) power signal, and modulate the DC power signal to a DC level required by the coil apparatus; and
the second diplexer is configured to; receive the recovered separate local oscillator signal and send the recovered separate local oscillator signal to the coil apparatus, and receive, from the coil apparatus, an intermediate frequency signal generated by mixing a magnetic resonance signal and the local oscillator signal, wherein the second diplexer is further connected to the at least one first signal coupler and configured to send the received intermediate frequency signal to the at least one first signal coupler.

2. The coil interface apparatus as claimed in claim 1, wherein the plug further comprises: a coil controller configured to: wirelessly receive a control signal from the main body of the MRI device; and generate a tuning/detuning signal to control tuning or detuning of the coil apparatus.

3. The coil interface apparatus as claimed in claim 2, wherein the coil controller is further configured to wirelessly transmit coil identification information characterizing the coil apparatus to the main body of the MRI device.

4. The coil interface apparatus as claimed in claim 1, wherein the power converter comprises a DC-DC converter configured to modulate the DC power signal to a DC power level required by the coil apparatus, a reference clock of the DC-DC converter being synchronized with a reference clock of the main body of the MRI device.

5. The coil interface apparatus as claimed in claim 1, wherein:
the coil apparatus comprises multiple coil units, and
the plug further comprises a local oscillator signal power divider connected between the first diplexer and the second diplexer, the local oscillator signal power divider being configured to split the recovered local oscillator signal into multiple local oscillator signals, and
the multiple local oscillator signals being: distributable via the second diplexer to the coil units of the coil apparatus, and usable to mix with magnetic resonance signals received by the coil units to generate the intermediate frequency signal.

6. The coil interface apparatus as claimed in claim 1, wherein:
the plug comprises a planar first printed circuit board, the first power coupler and at least one first signal coupler being integrated in the first printed circuit board; and
the socket comprises a planar second printed circuit board, the second power coupler and at least one second signal coupler being integrated in the second printed circuit board.

7. A magnetic resonance imaging (MRI) device, comprising:
at least one coil apparatus placeable at a tested part of a test subject and configured to receive a magnetic resonance signal via the test subject;
a main body; and
at least one coil interface apparatus including:

a plug configured to connect to a coil apparatus to receive a magnetic resonance signal via a test subject in the MRI device, the plug including a first power coupler, a power converter connected to the first power coupler, and at least one first signal coupler, a first diplexer connected between the first power coupler and the power converter, and a second diplexer connected between the first diplexer and the coil apparatus; and a socket configured to connect to a main body of the MRI device, the socket including a second power coupler and at least one second signal coupler, wherein:

the at least one first signal coupler is configured to inductively send a magnetic resonance signal received from the coil apparatus to the at least one second signal coupler by induction, and the at least one second signal coupler is configured to inductively receive the sent magnetic resonance signal;

the second power coupler is configured to inductively send an alternating current (AC) power signal to the first power coupler and the first power coupler is configured to receive the sent power signal, and receive a combination signal combining a local oscillator signal and an AC power signal supplied by the main body, and send the combination signal to the first power coupler;

the first diplexer is configured to: recover a separate AC power signal and a separate local oscillator signal from the combination signal, and transmit the recovered AC power signal to the power converter;

the power converter is configured to: convert the AC power signal received by the first power coupler from the second power coupler to a direct current (DC) power signal, and modulate the DC power signal to a DC level required by the coil apparatus; and the second diplexer is configured to: receive the recovered separate local oscillator signal and send the recovered separate local oscillator signal to the coil apparatus, and receive, from the coil apparatus, an intermediate frequency signal generated by mixing a magnetic resonance signal and the local oscillator signal, wherein the second diplexer is further connected to the at least one first signal coupler and configured to send the received intermediate frequency signal to the at least one first signal coupler; and the plug of the coil interface apparatus is connected to the coil apparatus, and the socket of the coil interface apparatus is disposed on the main body.

8. The MRI device as claimed in claim 7, wherein the main body comprises:

a controller configured to generate a control signal and wirelessly send the control signal to a coil controller of the coil interface apparatus to control tuning or detuning of the coil apparatus.

9. The MRI device as claimed in claim 8, wherein the controller is further configured to receive coil identification information characterizing the coil apparatus.

10. The MRI device as claimed in claim 7, wherein the main body comprises:

an alternating current (AC) power source connected to the socket of the coil interface apparatus and configured to supply the AC power signal and the local oscillator signal.

11. The MRI device as claimed in claim 10, wherein the MRI device comprises multiple of the coil interface apparatuses, the main body including a power divider configured to distribute the AC power signal supplied by the AC power source to the multiple coil interface apparatuses.

12. The MRI device as claimed in claim 11, wherein the main body further comprises a signal combiner configured to:

generate multiple combination signals based on the local oscillator signal and multiple power signals distributed by the power divider, and respectively send the multiple combination signals to corresponding coil interface apparatuses amongst the multiple coil interface apparatuses.

13. The MRI device as claimed in claim 10, wherein the coil apparatus comprises a mixer configured to:

acquire the local oscillator signal and generate the intermediate frequency signal based on the local oscillator signal and the magnetic resonance signal, and provide the intermediate frequency signal to the coil interface apparatus, wherein the at least one first signal coupler of the plug of the coil interface apparatus is configured to inductively send the intermediate frequency signal to at least one second signal coupler of the socket of the coil interface apparatus.

* * * * *